(12) United States Patent
Brooks et al.

(10) Patent No.: US 10,698,371 B2
(45) Date of Patent: Jun. 30, 2020

(54) SYSTEMS AND METHODS FOR CLASSIFYING IN-SITU SENSOR RESPONSE DATA PATTERNS REPRESENTATIVE OF GRID PATHOLOGY SEVERITY

(71) Applicant: 3M INNOVATIVE PROPERTIES COMPANY, St. Paul, MN (US)

(72) Inventors: Brian E. Brooks, St. Paul, MN (US); Yang Lu, Singapore (SG); Andrew T. Tio, Singapore (SG); Gilles J. Benoit, Minneapolis, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 317 days.

(21) Appl. No.: 15/324,763

(22) PCT Filed: Jul. 14, 2015

(86) PCT No.: PCT/US2015/040359
§ 371 (c)(1),
(2) Date: Jan. 9, 2017

(87) PCT Pub. No.: WO2016/011014
PCT Pub. Date: Jan. 21, 2016

(65) Prior Publication Data
US 2017/0205781 A1    Jul. 20, 2017

Related U.S. Application Data

(60) Provisional application No. 62/025,617, filed on Jul. 17, 2014.

(51) Int. Cl.
*G05B 13/04* (2006.01)
*G06Q 50/06* (2012.01)

(52) U.S. Cl.
CPC .......... *G05B 13/045* (2013.01); *G06Q 50/06* (2013.01)

(58) Field of Classification Search
CPC ............................. G05B 13/045; G06Q 50/06
(Continued)

(56) References Cited

U.S. PATENT DOCUMENTS 3,942,168 A * 3/1976 Whyte ................ H02J 13/0089
340/10.1
7,821,156 B2    10/2010 Katz et al.
(Continued)

OTHER PUBLICATIONS

Allen et al, "Case Study: A Smart Water Grid in Singapore", Massachusetts Institute of Technology (MIT) (Year: 2012).*
(Continued)

*Primary Examiner* — Kamini S Shah
*Assistant Examiner* — Faraj Ayoub

(57) ABSTRACT

The present invention is directed towards methods and systems for characterizing sensors and developing classifiers for sensor responses on a utility grid. Experiments are conducted by selectively varying utility grid parameters and observing the responses of utility grid to the variation. Methods and systems of this invention then associate the particular responses of the utility grid sensors with specific variations in the grid parameters, based on knowledge of the areas of space and periods of time where the variation in grid parameters may affect the sensor response. This associated data is then used to updating a model of grid response.

15 Claims, 7 Drawing Sheets

(58) Field of Classification Search
USPC .......................................................... 703/18
See application file for complete search history.

(56) References Cited

U.S. PATENT DOCUMENTS

| | | | |
|---|---|---|---|
| 7,945,524 B2 | 5/2011 | Anderson et al. | |
| 7,991,512 B2 | 8/2011 | Chandra et al. | |
| 8,103,388 B2 | 1/2012 | Goodnow et al. | |
| 8,121,741 B2* | 2/2012 | Taft | G01D 4/004 |
| | | | 700/295 |
| 8,234,016 B2 | 7/2012 | Boss et al. | |
| 8,494,826 B2 | 7/2013 | Richards et al. | |
| 8,504,214 B2 | 8/2013 | Genc et al. | |
| 8,509,953 B2 | 8/2013 | Taft | |
| 8,571,721 B2 | 10/2013 | Boss et al. | |
| 8,583,405 B2 | 11/2013 | Chow et al. | |
| 8,589,198 B2 | 11/2013 | McMullian | |
| 8,600,572 B2 | 12/2013 | Sri-Jayantha | |
| 8,639,392 B2 | 1/2014 | Chassin | |
| 2008/0106425 A1* | 5/2008 | Deaver | G01R 19/16547 |
| | | | 340/646 |
| 2010/0102936 A1 | 4/2010 | White et al. | |
| 2010/0177450 A1 | 7/2010 | Holcomb et al. | |
| 2010/0306014 A1 | 12/2010 | Chow | |
| 2011/0066297 A1* | 3/2011 | Saberi | F16K 37/0091 |
| | | | 700/287 |
| 2011/0112987 A1 | 5/2011 | Basak et al. | |
| 2011/0125657 A1 | 5/2011 | Boss et al. | |
| 2012/0041696 A1 | 2/2012 | Sanderford, Jr. et al. | |
| 2012/0155557 A1 | 6/2012 | Bush et al. | |
| 2012/0290104 A1* | 11/2012 | Holt | G06Q 10/00 |
| | | | 700/29 |
| 2013/0077367 A1 | 3/2013 | Zhu et al. | |
| 2013/0138482 A1 | 5/2013 | Anderson et al. | |
| 2013/0191052 A1 | 7/2013 | Fernandez et al. | |
| 2013/0191320 A1 | 7/2013 | Avritzer et al. | |
| 2013/0204557 A1 | 8/2013 | Trudnowski et al. | |
| 2013/0232094 A1 | 9/2013 | Anderson et al. | |
| 2013/0268131 A1 | 10/2013 | Venayagamoorthy et al. | |
| 2014/0032187 A1 | 1/2014 | Legbedji et al. | |
| 2014/0148962 A1 | 5/2014 | Venayagamoorthy | |
| 2014/0191746 A1 | 7/2014 | Davie et al. | |

OTHER PUBLICATIONS

Allen et al, "Case Study: A Smart Water Grid in Singapore", Massachusetts Institute of Technology (MIT), "Allen" (Year: 2012).*

Whittle et al, "Waterwise@SG: a testbed for continuous monitoring to the water distribution system in Singapore", Water Distribution System Analysis 2010, Massachusetts Institute of Technology (MIT), "Whittle" (Year: 2010).*

Pasdar et al, "Detecting and locatingfaulty node sin smart grids based on high frequency signal injection", IEEE Transactions on Smart Grid, vol. 4, No. 2, 2013 "Pasdar" (Year: 2013).*

Pasdar, "Detecting and Locating Faulty Nodes in Smart Grids Based on High Frequency Signal Injection," IEEE Transactions on Smart Grid, Jun. 2013, vol. 4, No. 2, pp. 1067-1075.

Pierre, "Probing Signal Design for Power System Identification," IEEE Transactions on Power Systems, May 2010, vol. 25, No. 2, pp. 835-843.

International Search Report for PCT International Application No. PCT/US2015/040359, dated Oct. 19, 2015, 3 pages.

* cited by examiner

SYSTEMS AND METHODS FOR CLASSIFYING IN-SITU SENSOR RESPONSE DATA PATTERNS REPRESENTATIVE OF GRID PATHOLOGY SEVERITY

CROSS REFERENCE TO RELATED APPLICATIONS

This application is a national stage filing under 35 U.S.C. 371 of PCT/US2015/040359, filed Jul. 14, 2015, which claims the benefit of U.S. Provisional Application No. 62/025,617, filed Jul. 17, 2014, the disclosures of which are incorporated by reference in their entireties herein.

BACKGROUND

The performance of utilities grids—their reliability, safety, and efficiency—can be drastically improved through sensing key parameters and using those results to direct the operations and maintenance of the grid, by identifying faults, directing appropriate responses, and enabling active management such as incorporating renewable sources into electrical grids while maintaining power quality.

Sensor networks are often used to monitor utilities grids. These sensor networks may include smart meters located at the ends of the grid, sensors at grid nodes, and sensors on or around the utilities lines, these sensors measuring grid parameters such as flow rates in water grids, power quality in electrical grids, or pressures in utilities grids. These sensors are transducers, usually outputting analog signals representative of the measured properties. These outputs need to be characterized to map to specific values of those properties, and/or classified so that they may represent particular states of the world, such as a potential leak that requires investigation, or identification of a difference in phases when incorporating a renewable resource into an electrical grid. Characterization of sensors is usually done through bench testing, while the sensors may have various interferences in the environment surrounding them; in-situ characterization of sensors on a utility grid monitoring network would be preferred, but is difficult for the large numbers of sensors used to monitor a utilities grid.

The trend in analyzing sensor data and directing responses is "big data," which uses large amounts of grid historical data to build models used for classification and direction of responses. These big data models, however, are limited to correlations, as they mine historical data to build the models, limiting their effectiveness for actively directing treatments or making fine adjustments. Further, these big data models typically require large volumes of data that prevent highly granular understandings of grid conditions at particular grid nodes or locations or that can only achieve such granularity after long operations; some have applied machine learning techniques and improved models to increase speed and granularity, but even these approaches continue to rely on correlations from passively collected historical data.

Signal injections have been used to highlight grid faults, such as discovering nodes where power is being illegally drawn from an AC power grid; these techniques rely on already-characterized high-quality sensors such as "smart meters" and are occasional, grid-wide individual actions, not coordinated to be conducted concurrently or sequentially. Signal injections have also been used to test grid-wide response to large changes in high levels of the grid, such as at the HVDC distribution level. Those signal injections have been large, individual, and human mediated, not susceptible to automation, smaller-scale local testing or concurrent or sequential implementation of tests. Occasional, grid wide, and almost necessarily human-directed signal injections are poorly suited for characterizing extensive networks of diverse sensors placed along the grid in a wide variety of contexts, since they can only generate small sample sizes and cannot vary widely enough to be tailored to individual conditions and idiosyncrasies of the sensor locations.

Utilities grid management would benefit greatly from real-time cause-and-effect understanding of sensor responses to overcome the issues with big data smart grid approaches and allow for real-time, granular, and fine-tuned grid monitoring and management to more fully capitalize on the potential of smart grid to optimize grid parameters and responses, by enabling such optimization to be done at more local levels across these highly variant systems.

SUMMARY OF THE INVENTION

The present invention is directed towards characterizing sensors and developing classifiers for sensor responses on a utility grid, by implementing changes to grid parameters, computing the spatial and temporal reach of those changes to grid parameters, observing the responses at grid sensors, associating the responses at grid sensors with implemented changes to grid parameters based on the time and location of the responses, and updating a model of grid response based on the implemented changes and their associated responses.

Systems of the invention include signal injection directors, signal injection controllers, a plurality of sensors collecting grid data, an association module, an analysis module, and a model memory.

DETAILED DESCRIPTION OF VARIOUS EMBODIMENTS

Automated testing of sensor responses to specific inputs, and the resulting causal-knowledge based characterization of sensors requires an automated means of associating sensor data with particular signal injections which have been made concurrently and sequentially, and in close spatial proximity to one another, especially on large networks where it is desirable to increase potential sample size and quickly learn sensor and grid responses to the injected signals. These responses to signal injections may be representative of grid events which are useful for management of the utility grid, automation of grid response to particular conditions, improving efficiency, identifying and remedying grid faults, or optimally scheduling required maintenance and reconditioning actions. This association is needed to properly use sensor data collected in response to a signal injection to improve models of sensor response used to convert raw sensor outputs into levels of a physical variable or classifications of potential statuses at the sensor and thus improve the sensitivity and discriminability of utility grid sensors, and to provide in-situ classification or characterization of the sensor outputs based on highly temporally and spatially granular models of sensor response and grid behavior.

Figure 1:
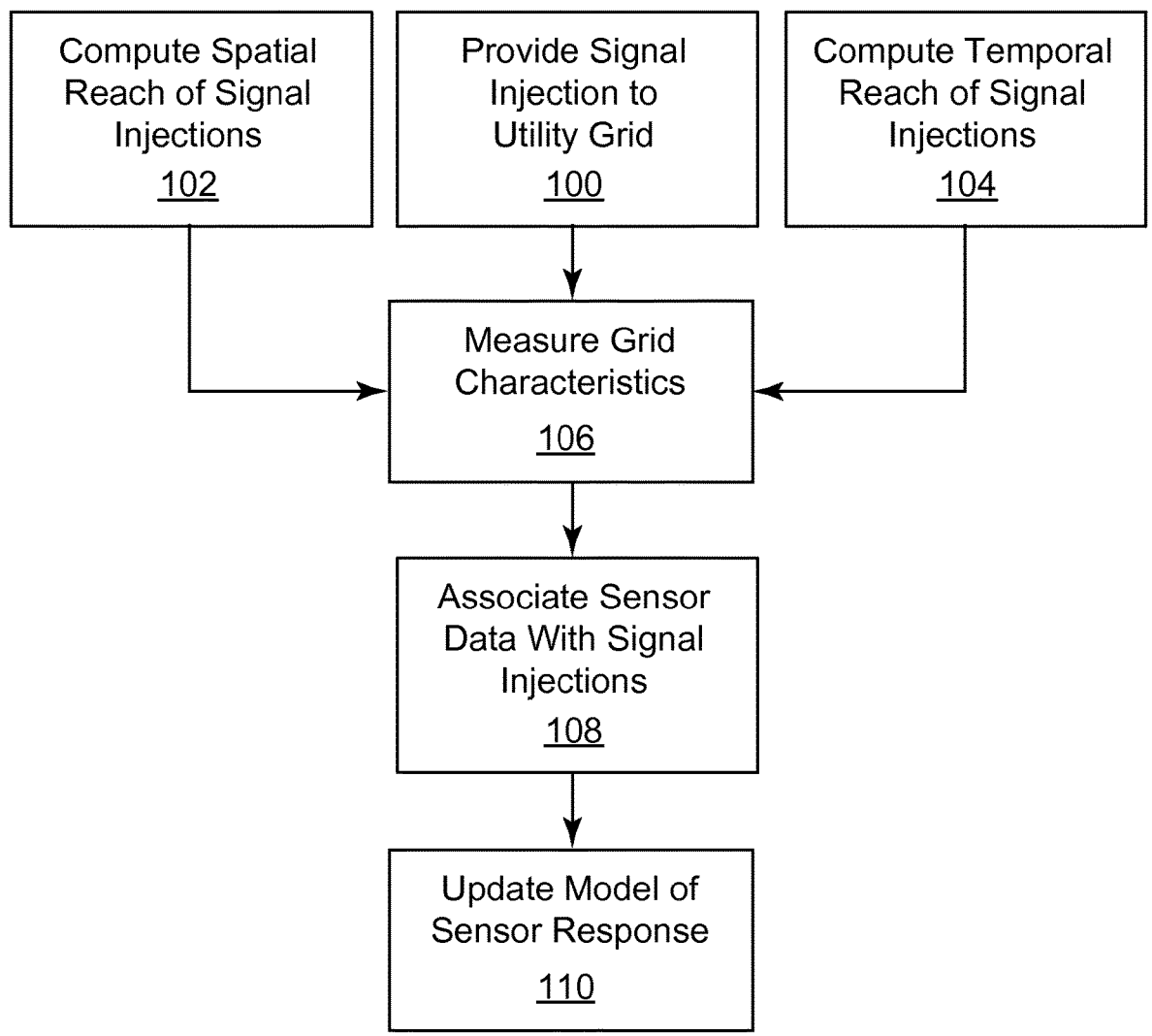
FIG. 1 is a flow diagram of the steps of a method of the invention.

FIG. 1 is a flow chart depicting an example of a method of the invention. One or more signal injection are provided to the grid in step 100. The signal injections each have a spatial reach, computed in step 102 and a temporal reach computed in step 104. Measurements of grid characteristics are made in step 106. Some of these steps may be taken independent of one another or be performed continuously, such as the measurements of step 106. The sensor data from step 106 is associated with particular signal injections in step 108, using spatial and temporal reaches computed in steps 102 and 104. Data associated with signal injection in step 108 may be used to characterize sensor responses or may be used to characterize the effects of the controls used to implement signal injections into the grid. In embodiments characterizing sensor responses, the associated data from step 108 then is used to update one or more models of sensor response in step 110. The updated models of sensor response may be used to detect and classify events at the sensors based on their raw readings, leading to more accurate sensing and calibrating the sensors to detect events of interest to grid operators against the baseline of their normal readings in the field. These methods may be done iteratively to refine and regularly update the models of sensor response, allowing regular in-situ calibration of grid sensors and accounting for changes in baseline conditions or sensor response characteristics.

The signal injection 100 is a change effected on grid components to introduce a particular condition into a utility grid, such as a water distribution grid, an electrical grid, or a gas distribution grid. This may be done by manipulating existing grid controls, and selecting and implementing one particular state within the range of permissible states for that grid control, for example selecting a particular position for a load tap changer at a transformer, or the switch state of a capacitor bank in a power distribution network. This signal injection 100 may be simple, manipulating one variable at one location, or complex and involving multiple variables and/or be implemented at multiple locations. An example of a simple signal injection 100 in a water grid may be increasing flow through a valve at a location. An example of a complex signal injection of step 100 in a gas grid may be increasing the pressure at one point while closing a valve immediately following that point to direct most of the pressure increase down one particular path. An example of a complex signal injection of step 100 in an electrical grid may be bringing on multiple renewable sources on line in a particular order and with specific timing, such as connecting the inverters for distributed photovoltaic generation sources and adjusting load tap changers at nearby substations minutes later.

The signal injection of step 100 may be implemented through automatic or human-mediated means. The signal injections are controlled changes in grid parameters, for example, electrical signal injections in electrical grids such as increases or decreases in current, voltage, or power factor caused by actuating grid controls. The signal injections may be coordinated to be separated in their spatial and temporal reaches. In gas grids, the signals may be injected through, for example, changing the routing of gas through pipes to increase or decrease the pressure at certain points. The responses to these signals may be the increase or decrease in the number and/or severity of leaks detected by a sensor network surrounding the grid pipes, or changes in downstream pressures connected to the areas being driven to high or low pressure. These signal injections may be accomplished in human-mediated cases through the manual adjustment of various valves and switches at the direction of a schedule distributed to maintenance personnel who perform these adjustment; these schedules may take various forms, such as maintenance queues, additional tasks, and may be distributed through a variety of electronic means such as email, text message, calendar reminders on a computer, tablet, smart phone or other portable computing device. In these human-mediated cases, the times of these adjustments may be audited by having the maintenance personnel check in using a networked device to record the time the changes are actually implemented, for use in the processing of subsequent data generated as a result of these signal injections. In fully machine-to-machine implemented embodiments of signal injection on gas grids, the switches and valves are operated by actuators coupled to the system through a wired or wireless communications network, and responding to signals sent by the system or acting in accordance with instructions or schedules distributed to the controllers for those actuators by the system. Machine-to-machine implementations allow for more closely coordinated tests as there will be less variance in the time of implementation, and the improved timing allows more sophisticated trials to be conducted. In these implementations, monitoring of the sensor conditions and actuator states may be constantly correlated to create a real-time understanding of relationships among spatially and temporally distributed influences, enabling changes in relationships as well as local sensor states to be detected and characterized, for example through factorial isolation of detected changes.

In electrical grids, human-mediated methods involve manual switching of power flow, activating or deactivating power sources connected to the grid, changing load tap changer positions, switching capacitor banks on and off, activating or deactivating heavy industrial equipment (such as arc furnaces) or other major manually-controlled power loads on the grid. In these examples, the changes are made by the maintenance personnel at the direction of a schedule distributed to them; these schedules may take various forms, such as maintenance queues, additional tasks, and may be distributed through a variety of electronic means such as email, text message, calendar reminders on a computer, tablet, smart phone or other portable computing device. In these human-mediated cases, the times of these adjustments may be audited by having the maintenance personnel check in using a networked device to record the time the changes are actually implemented, for use in the processing of subsequent data generated as a result of these signal injections. These human-mediated methods may alter measurable factors such as power quality, line temperature, line sag, available power levels, and other factors, which may be captured by sensor networks observing those measurable grid factors.

In electrical grids, machine-to-machine methods offer a greater measure of control, and can inject signals through a variety of automated means. This includes automation of the types of switching and maintenance behaviors that may be used in human-mediated examples such as changing the position of load tap changers, or switching capacitor banks, and additionally M2M methods of signal injection may capitalize on greater precision and breadth of control to include actions such as coordinating use of devices such as appliances at end locations to create coordinated demand and loading at consumer locations, or to implement complex coordination of combinations of multiple types of grid-influencing actions to generate more complex conditions, or introducing changes into the automatic power factor correction units. These combinatoric possibilities are very difficult to address through big-data approaches, since even large volumes of data may only have limited sample sizes reflecting particular combinations, and the sheer number of combinatoric possibilities makes big data solutions to these problems nearly intractable. These may be initiated through automatic control of the associated grid components and networked devices, including power generation, switches, voltage regulation equipment, smart meters and smart appliances receiving power from the grid, and other grid components susceptible to remote control by the system. These may take advantage of millisecond-level control capabilities to manipulate power quality variables such as the integration of new sources or immediate responses to new loads or the specific operation of automatic power factor correction units, as well as further increasing the ability to test combinatorics of grid actions or conditions involving those highly time-sensitive variables.

The injected signals may be simple, directing one individual grid action such as opening a valve in a water or gas grid, or bringing one particular renewable source online or altering the output voltage from one substation in electrical grid examples to change the grid conditions, or they may be complex, composed of multiple grid actions coordinated such that their individual spatial and temporal reaches overlap to produce a multi-factor treatment at areas within the overlapping reaches. One example of a complex grid action may be to vary both load tap changer positions and capacitor bank switching simultaneously to provide more fine-grained control over reactive power in an electrical grid. This multi-factor treatment may include variances of multiple different grid parameters, for example to explore combinatoric effects of those parameters, or may be used to produce multiple instances of similar variations of a particular grid parameter, for example to use additive effects to increase the magnitude of a particular variance of a grid parameter at one or more specific locations on the grid while protecting more sensitive neighboring parts of the grid by keeping them within narrower or different operational ranges by exposing those parts to only a component of the overall signal injection; for example, the power levels at sensitive nodes around a more robust node may each be given an increase that has a predicted spatial reach that includes the more robust node, but not other sensitive nodes, and these multiple sensitive nodes may each provide a power increase within their narrower operational ranges to produce a combined increase in power at the robust node that exceeds the individual increases at each sensitive node.

For complex signals, the temporal and spatial reaches are predicted based on treating the complex signal's effects on the system as a whole, composed set. For those complex signals, while individual grid actions will have overlapping spatial and temporal reaches, the defined set of grid actions that make up the complex signal is instead treated as one signal injection, with the overall spatial and temporal reach of the combination of the defined set of grid actions used to determine the areas of space and periods of time where no other signals may be injected into the grid, to maintain the orthogonality of the complex signal injection from other grid signal injections.

Complex signals may be input into the system having already been defined as the set of grid actions to be done together and the times and locations of those grid actions, after being derived by other systems or selected by grid personnel, or may be derived by systems selecting multiple grid actions from the set of grid actions as directed by, for example, a Partially Observable Markov Decision Process (POMDP) model exploring combinatorics or operating within constraints on operational conditions that vary from location to location across the grid.

Signal injections exploring grid responses may be composed by searching for waveforms that have a spatial-temporal regularity with any controlled grid activity, which are co-occurring in immediate or regular delayed fashion, through for example, Principal Component or Fourier analysis. These statistical regularities in waveforms or component waveforms (for example, the frequency, voltage, and/or current) link grid actions with changes in grid conditions to provide the set of available options for manipulating grid conditions based on active control of grid actions and data on the observed times and locations of these waveform components relative to the grid actions may be used to determine spatial and temporal reaches for particular signal injections.

A processor is used to compute the signal injection's spatial reach in step 102 and the signal injection's temporal reach in step 104. The spatial reach is the area over which sensors will show response to that signal based on the location and nature of that injected signal. The spatial reach can be computed by predicting, to a high confidence interval, the furthest sensor that would show a response to the injected signal and preventing any other trial from being conducted if it is likely to produce a response in the region of spatial uncertainty during the period of spatial uncertainty for the current trial. Temporal reach is the period over which the sensor network will be observing events related to the injected signal. This includes the duration of the signal itself, and the duration of the expected sensor response to the signal, for example a prediction based on historical data associating waveform components with particular grid actions that implement the signal injection. This temporal reach may be determined by using the expected time at a high confidence interval of the sensor response being completed, and using that as the duration for relevant data and a period from which to exclude other trials having a common spatial reach. The spatial and temporal reaches for these injected signals may be based on current models of the grid based on the nature and magnitude of the injected signal, the components and connections and/or the current data on grid responses to perturbations. For example, for a signal injection made by switching a capacitor bank on a distribution network, the spatial reach may be the downstream portion of the distribution network, and an example of the temporal reach may be the time it takes for transients introduced by the switching of the capacitor bank to settle. One particular method for calculating these reaches is a Bayesian Causal Network, which starts by discovering correlations through data mining then directly tests causality and directionality within those identified correlations. In gas grids, for example, the spatial reach of a pressure increase may be determined based on a map of the grid components, such as the branches of pipes and the volumes of the pipes and the behavior of the gas under pressure, particularly the segments of the grid downstream from the increased pressure and the magnitude of the pressure increase; the temporal reach may be the duration at which the increased pressure is maintained, plus a time lag for the effects of the pressure increase to fade at the furthest-out points at which the pressure is expected to have observable effects, again relying on the known characteristics of the utility and the grid, such as the branches and volumes of pipes and pressure characteristics of a gas grid. Historical data for the spatial and temporal reaches may be generated actively generated by conducting consistent signal injections while varying the temporal and spatial reaches over which data is associated with the signal injection, and finding the temporal and spatial reaches that capture the fullest extent of the signal injection without growing so large as to become confounded; this may be determined by finding the spatial and temporal reach values that produce the peak measured response to the signal injection.

Measurements are taken at a plurality of sensors distributed across the utility grid 106. The sensor measurements are typically continuous. The sensors may be, for example, for water grids flow meters whose response is based on the speed of water flow through a pipe, for gas grids methane detectors whose response is based on methane concentration, and for electrical grids cabled sensor terminations providing voltage and current wave forms at the termination. The sensor data also includes metadata or other indications of the time at which the data was collected and the specific sensor or the location where the data was collected.

The measurements taken across the grid in step 106 are then associated with a signal injection in step 108. The association made in step 108 is based on the spatial and temporal reaches computed in steps 102 and 104, which describe the time and space over which signal injections are likely to have effects captured by the sensors. The sensor data collected in step 106 is parsed by the time of the sensor measurements and the location of the sensors or of the data, using metadata accompanying the sensor data to provide the time and location information. The parsing assigns the sensor data to specific signal injections that could influence the readings at a particular time and location; some sensor data may be collected that lies outside the temporal or spatial reaches of the signal injections to the grid; this data is not associated with a particular signal injection. This allows multiple signal injections to be made concurrently along the grid while still attributing particular sensor responses with specific signal injections, improving the efficiency of automated signal injection methods for characterizing grid sensors.

Figure 5:
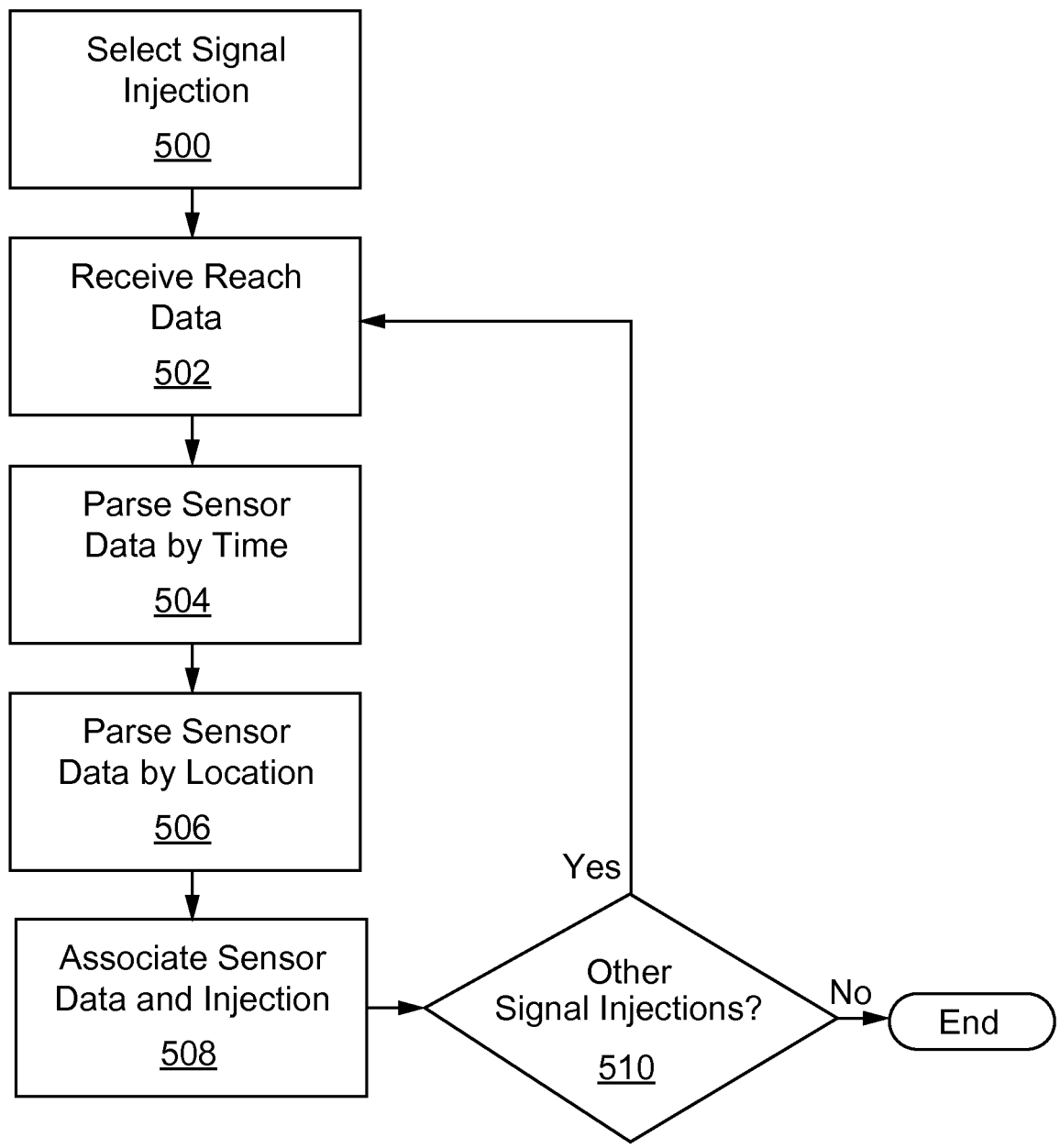
FIG. 5 is a flow diagram of an example method for associating sensor responses with signal injections.

An example method for the association of signal injections and sensor data of step 108 is detailed in FIG. 5. A signal injection is selected in step 500, reach data for that signal injection is received in step 502, sensor data is parsed by time in step 504, sensor data is then parsed by location in step 506, sensor data identified in the parsing steps is associated with the signal injection in step 508, and additional signal injections are checked for and the process iterated for those signal injections in step 510.

A signal injection is selected in step 500. The signal injection is selected from the set of signal injections that have not yet had grid sensor data associated with them. Then, the reach data for that signal injection is received in step 502. The reach data is the particular spatial and temporal reach of the selected signal injection, which is computed based on the nature of the signal injection and stored in memory. Combined with the actual time and location of the signal injection, this data defines a region of space and period of time where the signal injection was likely to have an effect on a utility grid, detected by sensors on or near the grid.

The sensor data is parsed by time in step 504. Sensor data has timestamps associated with samples or ranges of time from which continuous measurements are taken. For individual, time-stamped samples, the parsing by time is a comparison of the time at which the sample was taken against a range of times during which sensor data could be associated with the signal injection, based on the time of the signal injection and the temporal reach of the signal injection, creating a span starting at the time of the signal injection and having a duration of the temporal reach, during which data may be associated with the signal injection.

The sensor data is parsed by location in step 506. Sensor data also includes the location of the sensor, either directly as coordinates or indirectly, such as an identifier of the sensor that collected the data, which has a known location. The data is parsed by location by determining the area over which sensor data is associated with the signal injection, by using the spatial reach of the signal injection and the location of that signal injection. Coordinates or sensor locations are compared against that area and sensor data within that area may be associated with the signal injection. In this example, the parsing by location is done on data already parsed by time and determined to possibly be associated with the signal injection, meaning that data that may still be associated with the signal injection following this step will be associated with the signal injection in step 508. While this example has the data first being parsed by time and then location, the parsing steps may be done in reverse order, or done simultaneously and the results combined; in these examples, data is to be associated with a signal injection where the data was collected at a sensor within the spatial reach of the signal injection, and at a time within the temporal reach of the signal injection.

The parsed data is then associated with the signal injection in step 508. The data within the spatial and temporal reaches of the time and location of the signal injection, identified in the parsing steps is associated with the signal injection. This association may be done by adding the association to the sensor data as metadata, tags, a segment of the data itself, or other means of identifying that the data is associated with a particular signal injection. Optionally, during this association stage, confounded data may be identified if it already is associated with another signal injection, but was identified as being associable with the current signal injection based on the parsing by time and location. In these situations, the data point may be flagged, discarded, or its associations may be cleared so that it is not associated with any data point due to uncertainty about the signal injection or injections that influenced that data point.

Additional signal injections that have not yet had data associated with them are checked for in step 510 and these steps may be iterated for any signal injections that have not yet had data associated with them, for example by having each signal injection include a category of metadata indicating whether or not it has already been associated with data and changing that metadata from a 0 to a 1 during the association step. In that example, the metadata is checked for the signal injections, determining whether any signal injections still have a 0 representing their association with sensor data. When all current signal injections have been associated with sensor data, the association process ends.

Returning to FIG. 1, updating a model of sensor response is done in step 110 based on the associated sensor data from step 108 and data concerning the signal injection and the sensors, as well as the currently-existing model of sensor response. The model of sensor response may be one of a variety of models that map the sensor output to levels of a variable or the presence or likelihood of a particular grid condition at the sensor; it may also be a plurality of alternative models that link the sensor outputs to particular values of a variable or states surrounding the sensor. The particular updating process depends on the particular model or models selected to assign meaning to sensor outputs.

Updating the model may be used to improve the characterization of a sensor response. In these embodiments, the sensor response data may be used to falsify belief states in a Partially Observable Markov Decision Process or similar technique, where the belief states are a number of alternative models that characterize the sensor data; the falsification of belief states eliminates poor models, converging on the use of the best models as the method for mapping the sensor response to a level of a measured variable or the presence of a condition of interest at or near the sensor and improving the sensitivity and accuracy of the sensor by using updated models based on data from signal injections reaching that sensor, to process its outputs.

The updating of a model of sensor response may be the refinements of classifiers or probability estimates used to identify when sensor outputs are indicative of particular conditions. Classifiers determine that a state of the world or event is indicated by particular sensor output, because they map that sensor output data to a category. Probability estimates similarly map the sensor output to a state of the world or event, but do so as a range of probabilities of states or events that are possible for the given sensor output. An example of a classifier for a gas grid condition may be, for example, that signals indicative of methane levels elevated to twice the baseline level from 3 adjacent sensors on a sensor network is a high-priority potential leak event. An example of a classifier for an electrical grid condition is discovery of an association between a particular power source or load and a specific observable impact on power quality, found, for example through Fourier or wavelet transform analysis. One specific example of updating a classifier may be, in the grid example, identifying a signal that degrades power quality within the impact of integrating a solar source into the grid through Fourier analysis of the waveform data associated with bringing the solar source on-line, and identifying that component as a result of that renewable source integration.

The model of sensor response may be based on data from a particular window of time, which may be adjusted when the model is updated, and may be a pre-defined period, or one determined dynamically. For an example of a pre-defined period, models of sensor response may be based on data only from the past 30 days, in which case the updating process includes removing data that is older than that, in addition to incorporating the newly collected data. The period from which data is used in the model of sensor response may also be adjusted dynamically. For example, a trigger may be set so that where the addition of the current sensor data causes a shift in the mean values or confidence intervals for established relationships of signal injections and sensor outputs that are greater than a certain threshold indicative of a change in system response behavior, historical data may be discarded and data collection for determining relationships between signal injections and sensor outputs started over to accurately discover and reflect this change in system response behavior.

Figure 6:
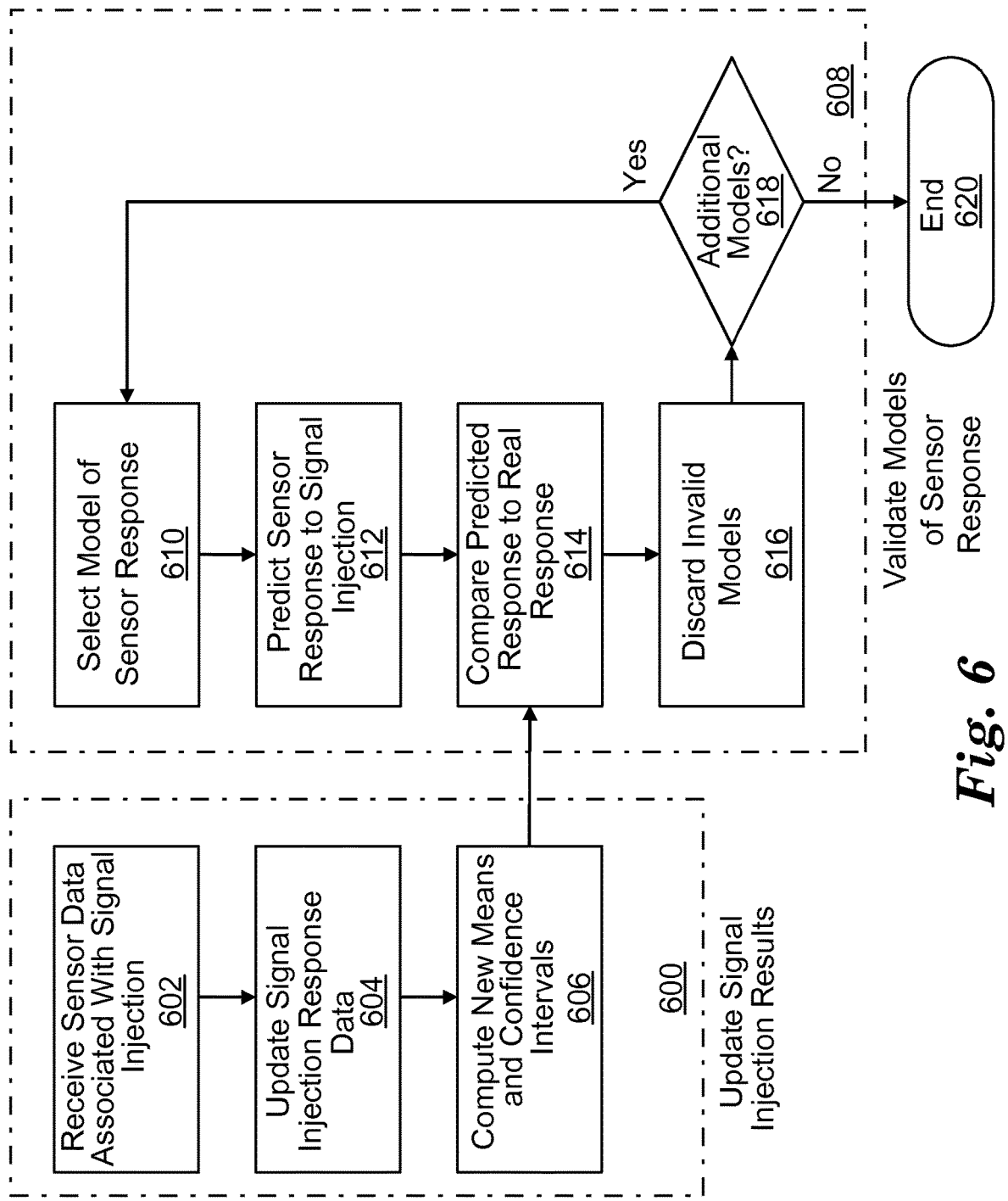
FIG. 6 is a flow diagram of an example method for updating a model of sensor response.

One particular example method for updating a model of sensor response using sensor data associated with particular signal injections is detailed in FIG. 6. In this example, the associated sensor data is used to update a database of knowledge regarding the effects of the signal injection 600. This process includes receiving data associated with a signal injection 602, updating signal injection response data 604, and updating means and confidence intervals for the signal injection response data 606. The knowledge database updated in 600 is used to validate models of sensor response 608. This process includes selecting a model of sensor response 610, using the model of sensor response to compute a predicted response to the signal injection 612, comparing the prediction to the means and confidence intervals for the effects of the signal injection 614, and if the predicted response lies outside the confidence intervals, invalid models are discarded 616. This is iterated for additional models of sensor response until all sensor models have been tested against the updated knowledge of the effects of the signal injection 618, and when the models have been tested, the process ends 620.

Data associated with a signal injection is received in step 602. The data is sensor data, which has been associated with a signal injection made into a utility grid, and associated based on the time and location of the data collection and the time, location and spatial and temporal reaches of the signal injection.

The data received in step 602 is used to update a signal injection response data in step 604. The signal injection response data may be stored as a table of inferential statistics relating the effect of the signal injection on the response of the sensor. This table describes the relationship between a particular signal injection and its effects on sensor responses. Sensor data associated with the signal injection described in the table is selected and added to the database. In step 606 this updated database is then used to compute an updated mean and updated confidence intervals for the relationship between the signal injection and the sensor response.

The now-updated knowledge of the relationship between the signal injection and the sensor response is used to test and validate models of sensor response 608. First, a model of sensor response is selected 610 from the set of models of sensor response. The selection may be random, or progressing through a set list, or selected based on estimates of its validity, for example through a Bayesian Causal Network where the model of sensor response is a belief state. The selected model of sensor response is used to compute the expected response to the signal injection 612. This computation uses the time, location, and nature of the signal injection and the model of sensor response to create an estimate of the sensor response to that particular signal injection. This expected response is compared to the current means and confidence intervals in step 614. In this step, the expected response according to the model of sensor response is compared to the sensor response data associated with the signal injection. If the expected response is within the confidence intervals of the current signal injection response data, the model remains valid. If the expected response falls outside the confidence intervals for the response of the sensor to the signal injection, the model is determined to be invalid and the model is discarded 616. The valid models are used to evaluate incoming sensor data.

The process is iterated by checking for models of sensor response that have not yet been tested against the current database of sensor response to signal injections in step 618. This may be determined, for example, by having a timestamp for both the last time the database was updated and the last time the model was updated, and checking the model update timestamps against the database update timestamp. When all models are current, the process ends 620.

The updated sensor model or models may then be used to interpret sensor results, improving the capability of the sensor to detect and report various states of the world or events through the falsification of incorrect aspects of the sensor response model or models. This updated sensor model can be used to trigger responses such as alarms for particular leak severities on gas grids, or deviations in power quality or drops in voltage requiring remedial actions on electrical grids. The updated sensor model is generated with the sensor already placed in the field, allowing automatic calibration of the sensor and adjustment to its local environment and baseline conditions, improving the accuracy and reliability of sensor readings and refining its ability to inform grid operators of particular grid conditions.

Figure 2:
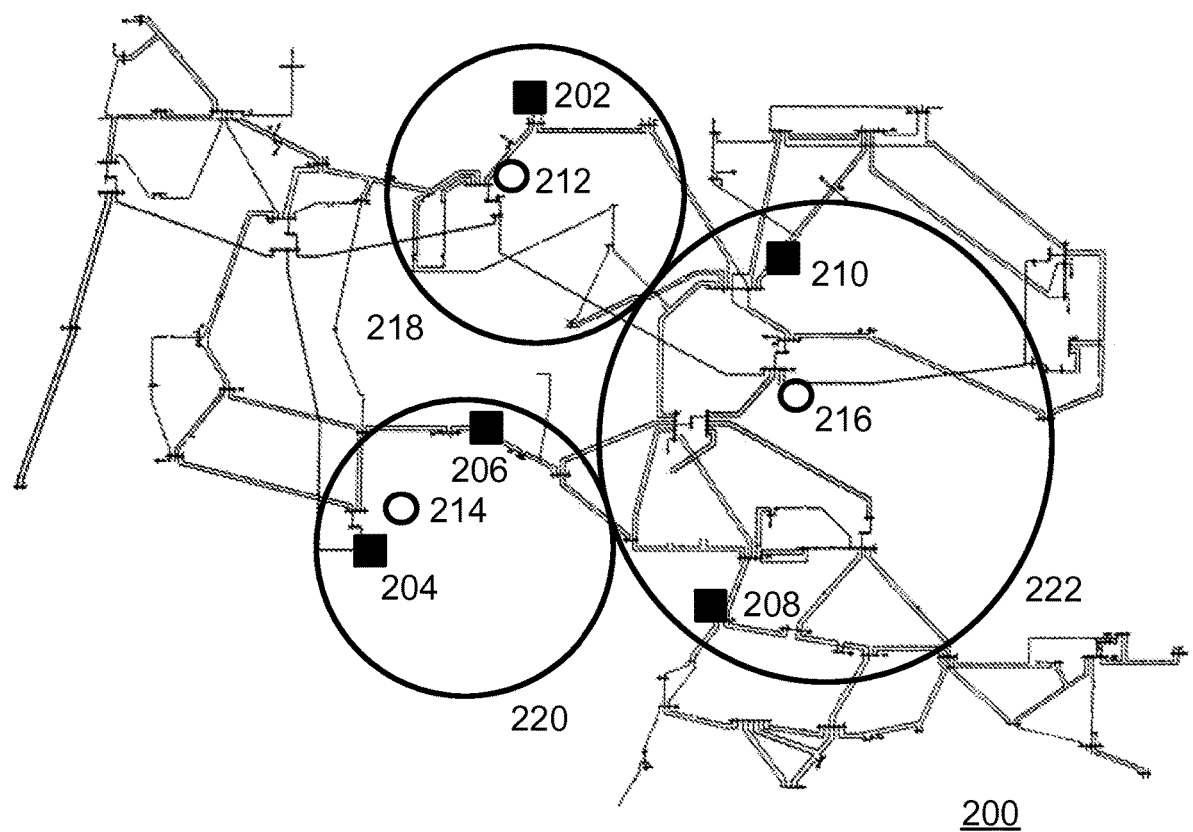
FIG. 2 is a map of a utility grid, its associated network of sensors, and the spatial reaches of signal injections on an example of the invention.

FIG. 2 shows one particular example of a utility grid, its associated sensors, and the reach of several signal injections that are made to the grid at close to the same time to illustrate the association of data from different sensors with different signal injections across a grid where there are multiple concurrent signal injections, maximizing the efficiency of such in-situ, automatic calibration without compromising the accuracy of a particular calibration due to confounds from signal injections that overlap in time and space. The utility grid 200 is a set of lines connecting sources of a utility (e.g. electricity, gas, or water) with various utility consumers. The sensor network includes sensors which are situated at locations 202, 204, 206, 208 and 210. Signal injections are made at locations 212, 214, and 216. The signal injection at 212 has a spatial reach represented by the reach area 218. The signal injection at 214 has a spatial reach represented by the reach area 220. The signal injection at 216 has a spatial reach represented by reach area 222. The spatial reach areas 218, 220, and 222 do not overlap, ensuring that the signal injections do not confound one another despite being deployed during the same time. The spatial reach areas 218, 220, and 222 all differ in size; this may result from differences in the nature (e.g. bringing a source online vs. switching selection of carrier lines in an electrical grid) or magnitude of the signal injection (e.g. the increase in pressure in psi of a signal injection to a gas grid), or of the predicted reach of the effects based on differences in the grid around the particular location of the signal injection (e.g. the volume of water lines branching from a particular node where flow is being increased in a water grid). The sensor at sensor location 202, being located in spatial reach area 218, has its sensor data collected during the temporal reach of signal injection 212 associated with that signal injection 212. The sensors at sensor locations 204 and 206, being located in spatial reach area 220, have the sensor data collected at those sensors during the temporal reach of signal injection 214 associated with that signal injection 214. The sensor located at sensor location 208, being located in spatial reach area 222, has its sensor data collected during the temporal reach of signal injection 216 associated with that signal injection 216. The sensor located at sensor location 210, lying outside all of the spatial reach areas during this period, does not have data associated with any of the signal injections 212, 214, or 216. These associations of data may then be used to update models of sensor response and grid conditions in accordance with step 110 of the method, enabling the sensors to be automatically calibrated in their locations on the grid, and refining the ability of those sensors to detect and report events or world states.

Figure 3:
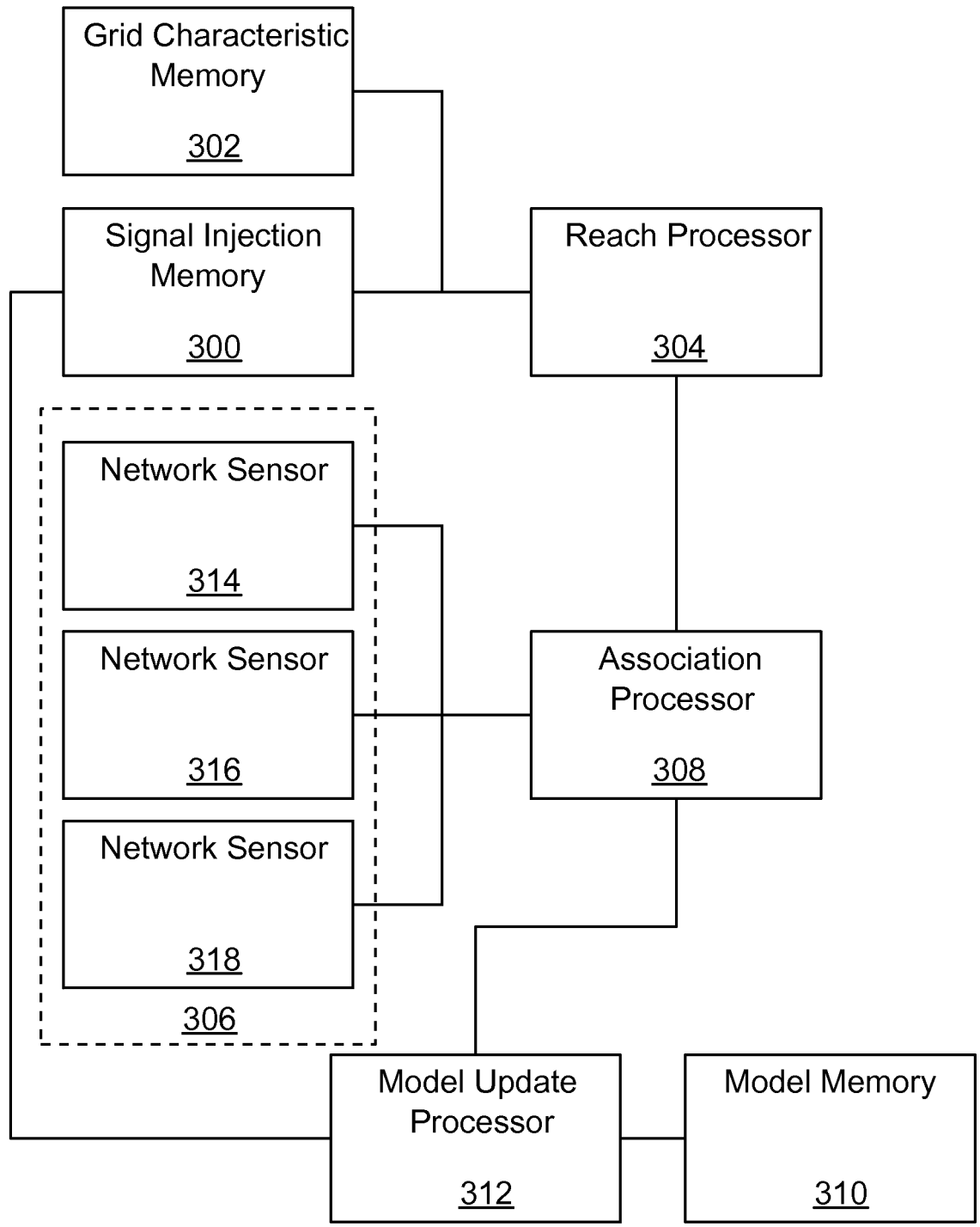
FIG. 3 is a system diagram of a system of the invention.

FIG. 3 is a diagram of an embodiment of the invention as a coordinated utility grid system. Memories may be known computer storage means such as flash memory, hard disk drives using magnetic media, or other methods for data storage that can store the data and be accessed frequently and regularly. Processors may be configured to make the calculations through software instructions. Connections among the components may be hard-wired, use of common processors for multiple steps, or networked through wired or wireless means such as the various 802.11 protocols, ZigBee or Bluetooth standards, Ethernet, or other known means for transmitting data among the separate sensors, processors, memories and modules. The sensors, memories, processors, and modules may be distributed across locations, including at the sensors themselves, or co-located in intermediate or central locations.

The signal injection memory 300 is a memory configured to store signal injection characteristics, including the time, location, and nature of signal injections to be made on the grid. The nature of the signal injection is the changes made to the grid conditions to effect the signal injection, such as the particular valves actuated in a water or gas grid, for example. Where the action may have variable magnitude, such as the amount of power supplied to the electrical grid by a turbine, the magnitude is also included in the data stored in this memory. The time and location are the time and location of the particular actions identified in the nature of the injection.

The grid characteristic memory 302 stores data on the grid components and their layout and connections, and the locations of sensors along the utility grid. This data may be stored in a number of forms, such as models of the grid including graphical, stochastic, or Markov chain models of grid component behavior, or databases of components, their locations, connections and/or their basic response characteristics.

The reach processor 304 is a processor configured to compute spatial and temporal reaches using signal injection and grid characteristic data, and optionally may also use historical data on past signal injections to compute these reaches by predicting the space and time where a signal injection is likely to impact sensor readings, by processing variables concerning the signal injection such as its nature, magnitude, and location, and the grid characteristics and past responses. The reach processor 304 preferably applies a Bayesian Causal Network to compute the reaches from signal injection and utility grid properties that are received as inputs.

The sensor network 306 is a plurality of sensors, the network sensors 314, 316, and 318, which are situated at various positions along the utility grid. These sensors may be on, in, or near the utility grid they monitor, and may monitor properties of the grid, the utility itself, or the effects of the utility grid on surrounding conditions. For example, on gas grids, the sensor network may include pressure sensors inside gas lines and/or methane sensors situated near gas lines. On water grids, sensors may be, for example, flow sensors inside pipes on the line. On electrical grids, the sensors may be, for example, sensored cable terminations, smart meters, voltage meters located at substations, line sag meters, and/or line temperature sensors. The sensors output electrical waveforms based on their transduction of the sensed variable. These sensors may be networked with one another, and are networked with the other components of the system; this may be through a variety of known wired and/or wireless means for communication of signals among devices.

Association processor 308 parses sensor data by the time and location of the sensor outputs and the temporal and spatial reaches of the signal injection. The processor receives information on the time and location of signal injections into the grid, and the temporal and spatial reaches of the signal injection. This data creates periods of time and space which are used to parse sensor output data by time and location of the sensor reading to ensure that the output of sensor network 306 at particular times and locations is associated with the proper signal injections to ensure that models of the sensor response can be accurately and efficiently updated using unconfounded data regarding response to known signal injections.

Model Memory 310 is a memory storing the characterization and/or classification models currently used by the grid to evaluate the sensor outputs. These models may be classifiers, probability estimates, or functions, which may be used to process sensor outputs. Multiple such models may be stored for each characterization or classification of data from sensors on the network, as the system tests and falsifies various models to converge on the best model or models for understanding sensor outputs through the systematic implementation of signal injections to test these models. These models also may be accessed and used to interpret sensor data to detect events or characterize conditions on a utility grid, for example by classifying sensor outputs as indicative or not indicative of a particular event, or using the model to convert a sensor output into measurements of a sensed metric.

Model update processor 312 is a processor configured to receive a current set of characterization and/or classification models and compute and implement updates to those models based on received sensor outputs and conditions associated with those outputs. One example of the model update processor 312's function is receiving sensor outputs associated with a signal injection, receiving the nature and magnitude of the signal injection, and the current models of sensor response, predicting sensor responses to the signal injection using the models of sensor response, and comparing the predicted responses with the actual sensor data from the signal injection, and, using a Partially Observable Markov Decision Process, adjusting belief states by, for example, rejecting models whose predictions deviate from the actual measured value by more than an error threshold amount. Updated models may be sent back to the Model Memory 310, where they may be used to interpret sensor outputs to detect events or characterize conditions along a utility grid.

Figure 4:
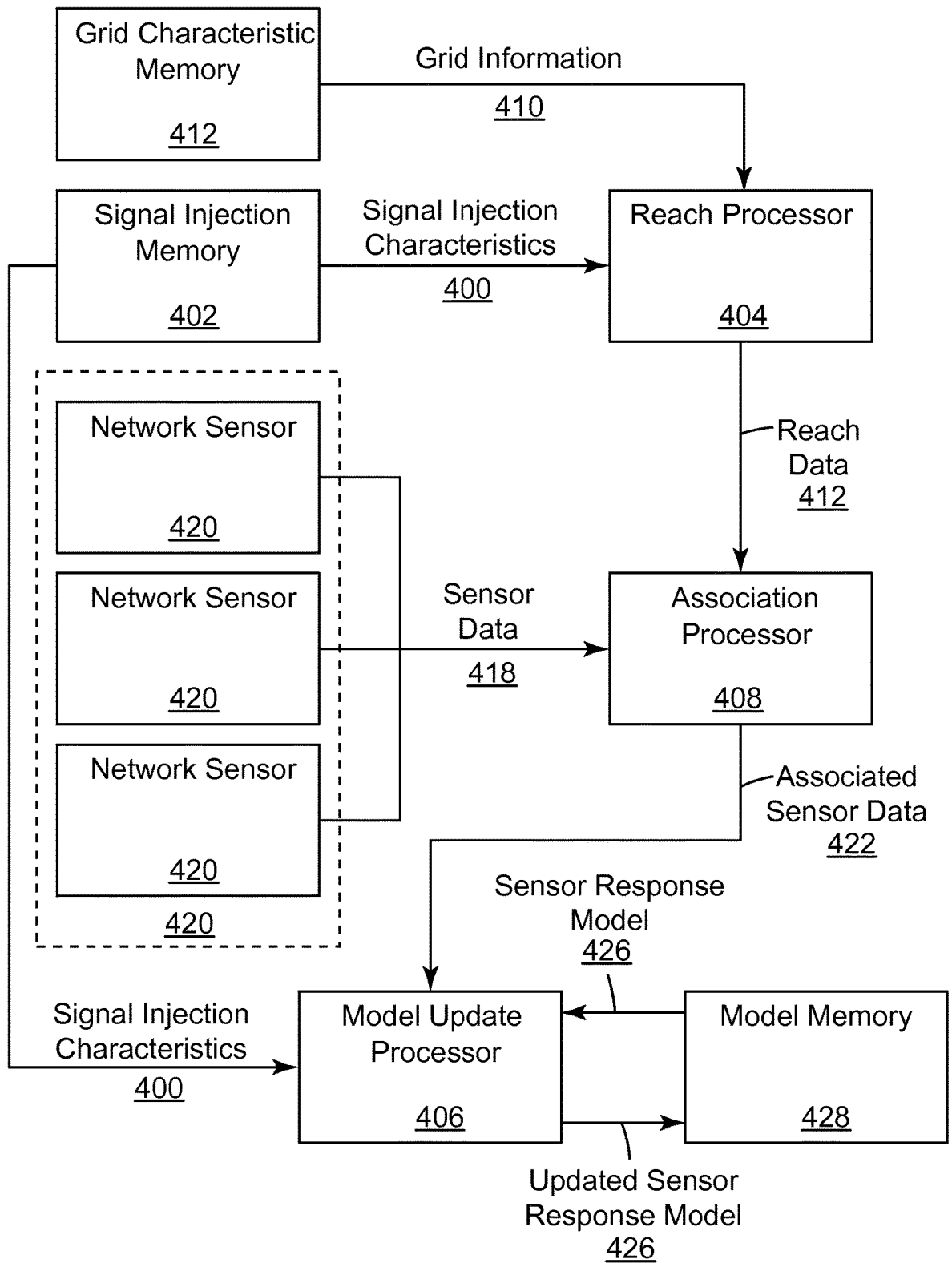
FIG. 4 is a data flow diagram of the flows of information among various components of a system of the invention.

FIG. 4 is a data flow diagram showing the exchange of information among the components of an embodiment of the invention as a coordinated utility grid system. Signal injection characteristics 400 are the magnitude, nature, and the time and location at which a signal injection is introduced into the utility grid. This data is stored in signal injection memory 402. The data is transferred from the signal injection memory 402 to the reach processor 404 to be used in computing the reach data 412, and is transferred from the signal injection memory 402 to the model update processor 406 where it is used to generate predictions in the current models that are subsequently used to falsify some of those models. The signal injection characteristics 400 may optionally be provided to the association processor 408, which may use the data to parse sensor data 418 and associate it with particular signal injections.

Grid information 410 is the layout of the grid and its components, and may optionally include historical data on grid states and responses to prior signal injections. The grid information 410 is stored in grid memory 412. The grid information 410 is transferred from the grid memory 412 to the reach processor 404, where the grid information is used to predict the spatial and temporal reaches 414 of signal injections. The grid information 410 may also be provided to the association processor 408 to match sensors to their locations to enable parsing of sensor data 418. Grid information 410 may also optionally be provided to the model update processor to be used in predicting responses to signal injections, to validate the models against the collected sensor data 418.

Reach data 414 is the regions of space and time that are predicted to be impacted by a particular signal injection. The reach data 414 is computed by reach processor 404, using the signal injection characteristics 400 and the grid information 410 to predict the regions of time and space impacted by the signal injection; the reach data may just be the size of the regions of time and space, or may also incorporate the times and locations of the signal injection to contain concrete areas of space and durations of time that are impacted by the signal injection. The reach data 414 is transmitted used by association processor 408 to establish the periods of time and locations at which sensor data 418 was collected that may be associated with signal injections, the association processor parsing the sensor data 418 to generate the associated sensor data 422 based on when and where the sensor data was collected in comparison to the signal injection and its reach data 414.

Sensor data 418 is raw outputs from the sensors 420 themselves, typically electrical waveforms output from a transducer; this data is typically generated continuously by the sensors 420. Alternatively, the sensor data 418 may be taken at discrete sampling periods, or may be stored locally at memories at the sensor or near a cluster of sensors, and pulled down from the sensors at particular times. The sensor data 418 is used by the association processor 408 to produce the associated sensor data 422.

The associated sensor data 422 is output from the association processor 408, which generates it by parsing the sensor data 418 by the reach factors 412 to associate the sensor data 418 with particular signal injections. The associated sensor data 422 output by the association processor 408 is transferred to the model update processor 424 where it is used to update belief states concerning sensor response models 426 that may characterize or classify sensor data.

Sensor response models 426 are various models that map the sensor data 418 to particular states, conditions, or events occurring at the sensors 420. These models may take the form of models that convert the sensor output to a level of a measured variable, or may be classifiers or probability estimates that map the sensor output or combinations of outputs to particular events happening across the grid, either indicating the presence or the likelihood of such an event. These models are stored in the sensor response model memory 428, and in systems of the invention, the sensor response models 426 are transferred from the model memory 428 to the model update processor 406, where the response models are updated or falsified based on associated sensor data 422 attributable to particular signal injections; the updated sensor response models 430 are transferred back from the model update processor 406 to the sensor response model memory 428. Updating the sensor response models allows for calibration of the sensors in-situ and improves the understanding of sensor outputs, improving the event detection and world state monitoring provided by the sensors of the sensor network through iteratively falsifying incorrect models of sensor response to world events of interest to utility operators, such as alerts for various conditions such as leaks and brownouts, or to remove noise from data, such as that used for process optimization efforts such as adjusting flow rates or controlling reactive power levels to support transmission while minimizing waste.

Figure 7:
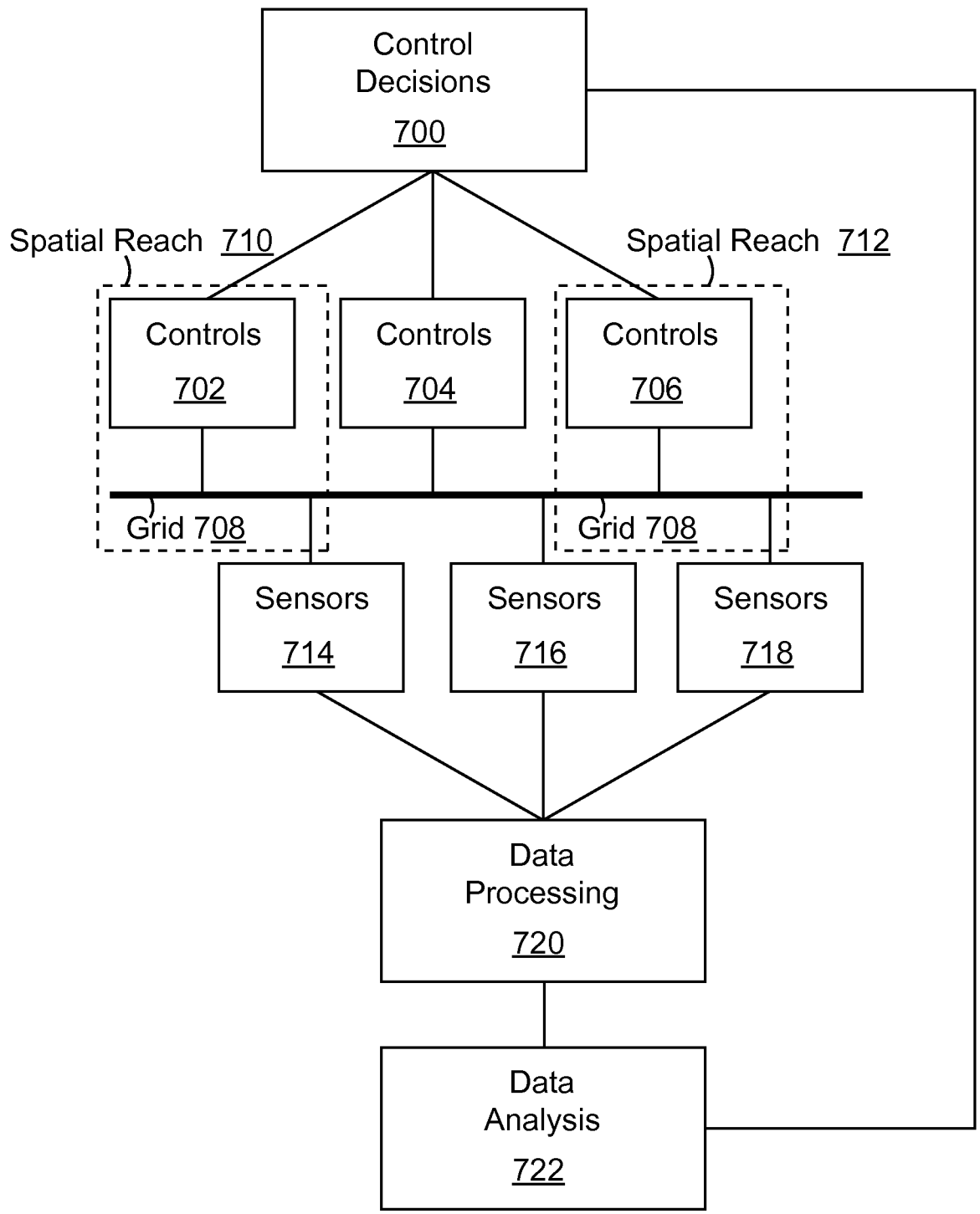
FIG. 7 is a diagram depicting the architecture of system embodiments and their interactions with a utility grid.

A simple example of an overall architecture involving an example embodiment of the invention is presented in FIG. 7. The control decision layer 700 makes decisions about the states for some or all gird controls. Grid control decisions are made according to methods ensuring that the manipulation of controls creates samples that do not influence one another, and optionally selecting the control decisions to provide high learning value or to improve particular grid parameters such as ensuring certain voltage levels in electrical grids, or flow rates in gas or water grids. The control decisions from the control decision layer 700 are carried out by the controls 702, 704, and 706. Examples of particular controls include capacitor bank switches, load tap changers, switches and storage devices on electrical grids, or valves and sources on water and gas grids. The controls may carry out the control decisions by, for example, actuating switches, moving load tap changer positions, and narrowing or widening valves. The actions of the controls change grid parameters, and those changes propagate through the grid 708. For example, opening a valve on a gas grid may cause pressures to increase downstream over time, within a certain distance from the valve, or in an electrical grid, power quality and reactive power levels may change based on the switching on or off of a capacitor bank. Sensors 714, 716, and 718 placed along the grid measure grid parameters, and detect the propagation of the signal injection through the grid 708. The signal injections are limited in the extent to which they propagate through the grid 708, defined as the spatial reach of that signal injection such as the spatial reach 710 outlining the region affected by the signal injected by control 702 and including the connection of sensor 714 to the grid 708, and spatial reach 712 outlining the region affected by the signal injected by control 706 and including the connection of sensor 718 to grid 708. Data processing layer 720 associates the data from sensors 714, 716, and 718 with signal injections whose spatial and temporal reaches include the sensor data, for example associating data from sensor 714 with data from a signal injection implemented by control 702 based on spatial reach 710, and associating data from sensor 718 with a signal injection implemented by control 706 based on spatial reach 712. The associated sensor data from the data processing layer 720 is then analyzed by the data analysis layer 722 to determine understandings about grid behavior and sensor response. This understanding of grid behavior generated by the data analysis layer 722 may, for example, take the form of sensor response models which are used to interpret the outputs from grid sensors 714, 716, and 718 during ordinary operations, for example to set thresholds or alerts for brownout conditions when voltage drops in an electrical line, or setting an alert for methane levels crossing normal operational thresholds. The data analysis layer 722 may interface with the control decision layer 700 to iteratively coordinate and implement signal injections into the grid and provide information that improves the selection of signal injections to implement, for example by predicting the effects of a signal injection on the grid or computing the extent to which learning may be refined by a particular signal injection.

What is claimed is:

1. A computer-implemented method for determining the effects of signal injections on sensor responses, comprising the following steps executed by a processor:
    implementing a first signal injection on a utility grid, wherein the first signal injection is a first change in a state of a grid control;
    implementing a second signal injection on the utility grid, wherein the second signal injection is a second change in the state of the grid control;
    receiving first sensor data from a first sensor;
    receiving second sensor data from a second sensor;
    receiving a first spatial reach for the first signal injection, wherein the first spatial reach is a first area over which sensors will show a first response to the first signal injection;
    receiving a first temporal reach for the first signal injection, wherein the first temporal reach is a first time period over which the first response will be observed;
    receiving a second spatial reach for the second signal injection, wherein the second spatial reach is a second area over which sensors will show a second response to the second signal injection;
    receiving a second temporal reach for the second signal injection, wherein the second temporal reach is a second time period over which the second response will be observed;
    coordinating the first and second signal injections such that the first spatial reach overlaps the second spatial reach, and the first temporal reach overlaps the second temporal reach;
    associating, using the processor, the first sensor data within the first spatial reach and within the first temporal reach with the first signal injection;
    associating, using the processor, the second sensor data within the second spatial reach and within the second temporal reach with the second signal injection; and
    updating a model of the first and second sensor response based on the associated first and second sensor data and the first and second signal injections, wherein the model maps the first and second sensor data to particular states, conditions, or events occurring at the first and second sensors in order to interpret outputs from the first and second sensors during operation of the utility grid.

2. The method of claim 1, wherein updating the model of the first and second sensor response comprises:
    predicting the first and second sensor response to the first and second signal injections using models of sensor response;
    comparing the associated first and second sensor data to the predicted first and second sensor response; and
    falsifying the models of first and second sensor response where the predicted first and second sensor response deviates from the associated first and second sensor data.

3. The method of claim 1, wherein updating the model of the first and second sensor response comprises:
    updating a database of sensor response to the first and second signal injections with the associated first and second sensor data; and
    computing, based on the updated database of sensor response to the first and second signal injections, relationship between the first and second sensor response and a grid parameter affected by the first and second signal injections.

4. The method of claim 1, wherein updating the model of the first and second sensor response includes removing data from the model of the first and second sensor response based on age of the data and an inclusion period.

5. The method of claim 1, wherein the model of the first and second response is an alert threshold.

6. The method of claim 1, wherein the model of the first and second response is a classifier.

7. The method of claim 1, wherein the first or second sensor data are electrical measurements.

8. The method of claim 1, wherein the first or second sensor data are methane concentration measurements.

9. The method of claim 1, wherein the first or second spatial reach is computed based on a database of grid response to previous signal injections.

10. The method of claim 1, wherein the first or second temporal reach is computed based on a database of grid response to previous signal injections.

11. A system for associating sensor data with particular signal injections into a utility grid, comprising:
a plurality of utility grid controls;
a plurality of sensors;
a sensor data memory configured to receive and store sensor data;
a spatial reach memory configured to receive and store spatial reaches for the signal injections, wherein the spatial reaches are areas over which the plurality of sensors will show responses to the signal injections;
a temporal reach memory configured to receive and store temporal reaches for the signal injections, wherein the temporal reaches are time periods over which the responses will be observed;
an association processor configured to associate data with the signal injections based on the spatial and temporal reaches of the signal injections, wherein the signal injections are changes in states of the plurality of utility grid controls;
a memory configured to store models of the plurality of sensors response; and
a processor configured to update models of the plurality of sensors response using associated sensor data, wherein the models map the sensor data to particular states, conditions, or events occurring at the plurality of sensors in order to interpret outputs from the plurality of sensors during operation of the utility grid,
wherein the signal injections are coordinated such that the spatial reaches overlap and the temporal reaches overlap.

12. The system of claim 11, further comprising:
the memory configured to store a database of previous grid responses to the signal injections;
a spatial reach processor configured to compute the spatial reaches of the signal injections based on the database of previous grid responses to the signal injections; and
a temporal reach processor configured to compute the temporal reaches of the signal injections based on the database of previous grid responses to the signal injections.

13. The system of claim 11, wherein the processor is configured to update models of the plurality of sensors response by comparing the outputs of models of the plurality of sensors response to data associated with the signal injections and falsifying at least some of the models of the plurality of sensors response.

14. The system of claim 11, wherein the plurality of sensors are located along the utility grid.

15. The system of claim 11, wherein the association processor is configured to compare time and location metadata of the sensor data with the spatial and temporal reaches of the signal injections.

* * * * *